US008285008B2

(12) United States Patent
Ishii

(10) Patent No.: US 8,285,008 B2
(45) Date of Patent: Oct. 9, 2012

(54) IMAGE PROCESSING APPARATUS, METHOD AND PROGRAM FOR FACILITATING RETRIEVAL OF AN INDIVIDUAL GROUP USING A LIST OF GROUPS, A LIST OF SELECTED GROUP MEMBERS AND A LIST OF MEMBERS OF THE GROUPS EXCLUDING THE SELECTED GROUP MEMBERS

(75) Inventor: Akiyoshi Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 12/560,912

(22) Filed: Sep. 16, 2009

(65) Prior Publication Data
US 2010/0080423 A1 Apr. 1, 2010

(30) Foreign Application Priority Data
Oct. 1, 2008 (JP) ................. 2008-256642

(51) Int. Cl.
*G06K 9/00* (2006.01)
(52) U.S. Cl. ........................ 382/118; 382/115
(58) Field of Classification Search .................. 382/118, 382/218
See application file for complete search history.

(56) References Cited

U.S. PATENT DOCUMENTS

| | | | | |
|---|---|---|---|---|
| 4,754,487 A * | 6/1988 | Newmuis | | 382/118 |
| 5,450,504 A * | 9/1995 | Calia | | 382/118 |
| 5,642,431 A * | 6/1997 | Poggio et al. | | 382/118 |
| 5,764,790 A * | 6/1998 | Brunelli et al. | | 382/118 |
| 6,111,517 A * | 8/2000 | Atick et al. | | 340/5.83 |
| 6,301,370 B1 * | 10/2001 | Steffens et al. | | 382/103 |
| 6,504,942 B1 * | 1/2003 | Hong et al. | | 382/103 |
| 7,477,805 B2 * | 1/2009 | Ohtsuka et al. | | 382/305 |
| 7,697,039 B2 * | 4/2010 | Shiota et al. | | 348/231.2 |
| 7,716,157 B1 * | 5/2010 | Bourdev et al. | | 1/1 |
| 7,868,924 B2 * | 1/2011 | Matsushita et al. | | 348/222.1 |
| 8,054,515 B2 * | 11/2011 | Yamakado et al. | | 358/474 |
| 8,078,623 B2 * | 12/2011 | Chou et al. | | 707/737 |
| 2002/0103813 A1 * | 8/2002 | Frigon | | 707/104.1 |
| 2003/0126121 A1 * | 7/2003 | Khan et al. | | 707/3 |
| 2003/0225693 A1 * | 12/2003 | Ballard et al. | | 705/42 |
| 2004/0017933 A1 * | 1/2004 | Lestideau | | 382/118 |
| 2004/0081338 A1 * | 4/2004 | Takenaka | | 382/118 |
| 2004/0104266 A1 * | 6/2004 | Bolle et al. | | 235/382 |
| 2004/0151381 A1 * | 8/2004 | Porter et al. | | 382/218 |
| 2006/0177110 A1 * | 8/2006 | Imagawa et al. | | 382/118 |
| 2007/0086626 A1 * | 4/2007 | Mariani et al. | | 382/115 |
| 2007/0098303 A1 * | 5/2007 | Gallagher et al. | | 382/305 |
| 2007/0133907 A1 * | 6/2007 | Yamamoto et al. | | 382/305 |
| 2009/0208108 A1 * | 8/2009 | Shimano et al. | | 382/190 |
| 2010/0080423 A1 * | 4/2010 | Ishii | | 382/118 |

FOREIGN PATENT DOCUMENTS

JP 10-234004 9/1998
JP 2006-079461 3/2006

* cited by examiner

*Primary Examiner* — Jason M Repko
*Assistant Examiner* — Gandhi Thirugnanam
(74) *Attorney, Agent, or Firm* — Cowan, Liebowitz & Latman, P.C.

(57) ABSTRACT

The image processing apparatus displays a list of individual information from which individual information selected by the individual information selecting unit and individual information lapped over the individual information included in the retrieved individual groups are excluded from individual information included in individual groups retrieved by the individual group retrieval unit, and the individual group retrieval unit narrows down individual groups to be retrieved by adding on individual information designated from the individual information displayed in the list.

19 Claims, 19 Drawing Sheets

FIG. 3

| VIDEO SECTION NO. | SHOOTING DATE AND TIME | VIDEO DATA |
|---|---|---|
| 0 | 2007/1/1 12:00 | VIDEO DATA 0 |
| 1 | 2007/2/5 13:15 | VIDEO DATA 1 |
| 2 | 2007/5/5 9:32 | VIDEO DATA 2 |
| 3 | 2007/10/10 14:22 | VIDEO DATA 3 |
| 4 | 2007/12/23 20:30 | VIDEO DATA 4 |

FIG. 4
| INDIVIDUAL NO. | INDIVIDUAL REPRESENTATIVE IMAGE | FEATURE |
|---|---|---|
| 0 | 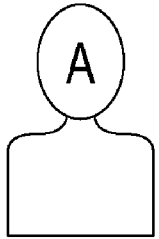 | FEATURE DATA A |
| 1 | 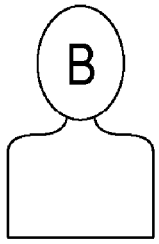 | FEATURE DATA B |
| 2 | 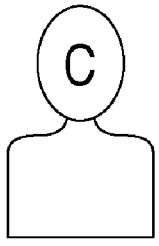 | FEATURE DATA C |
| 3 | 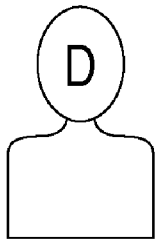 | FEATURE DATA D |

FIG. 5

| INDIVIDUAL GROUP NO. | INDIVIDUAL NO. | VIDEO SECTION NO. |
|---|---|---|
| 0 | 0, 1, 2 | 0, 2 |
| 1 | 0, 2 | 1 |
| 2 | 0, 3 | 3 |
| 3 | 0, 2, 3 | 4 |

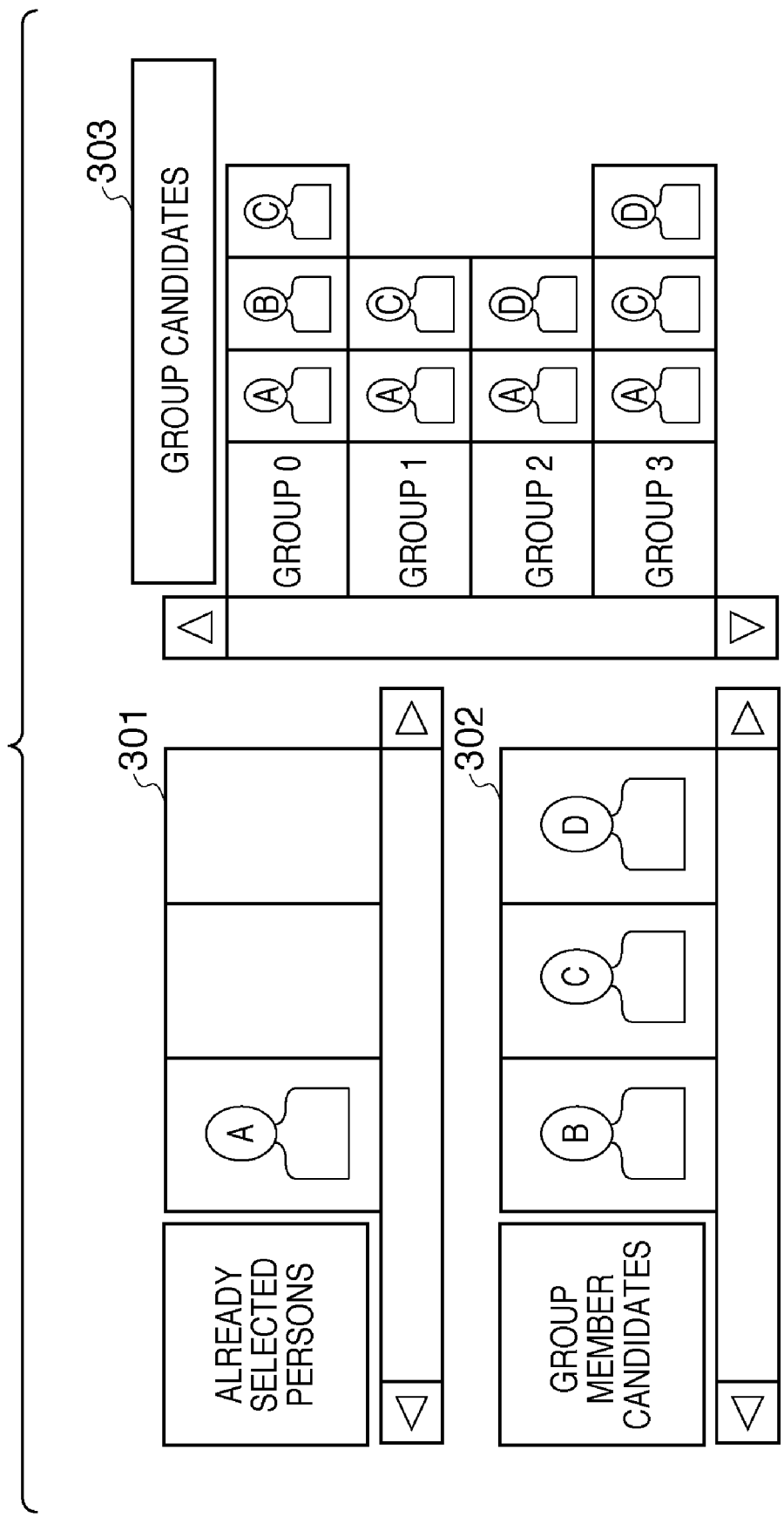

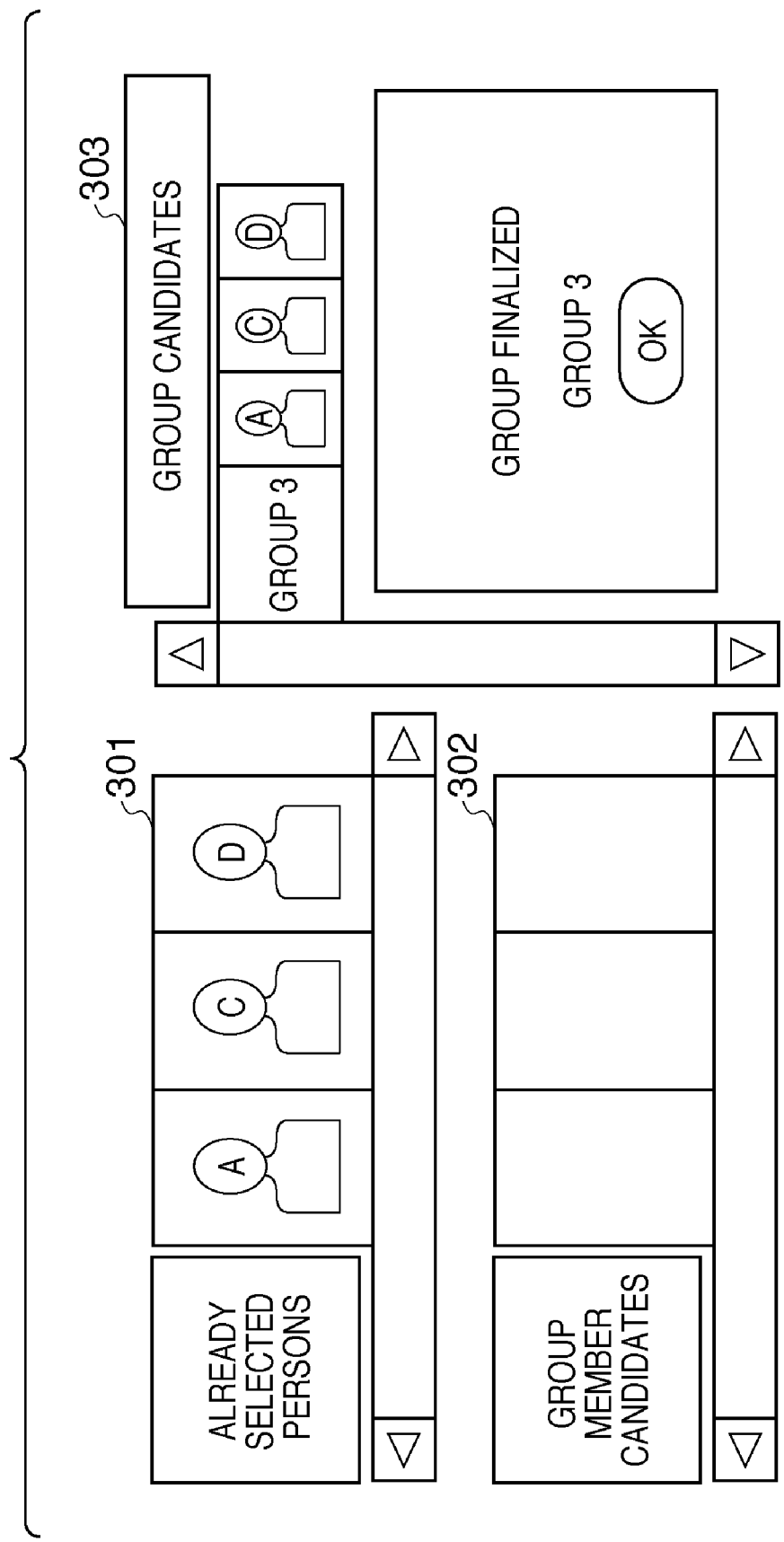

FIG. 17
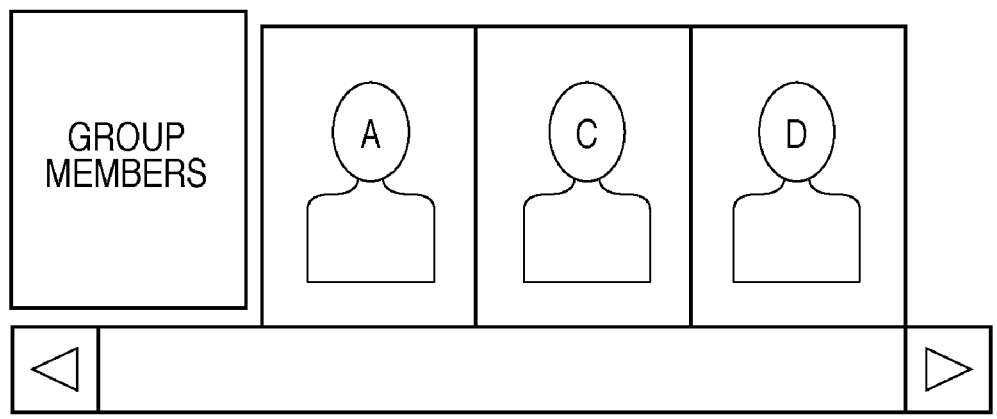
| SCENE NO. | THUMBNAIL | SHOOTING DATE AND TIME |
|---|---|---|
| 0 | | 2006. 8. 12 2:30 PM |
| 2 | | 2007. 1. 2 9:10 AM |
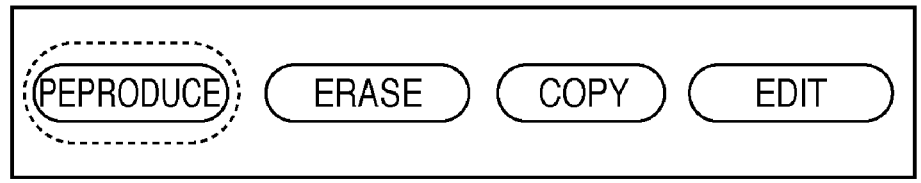

IMAGE PROCESSING APPARATUS, METHOD AND PROGRAM FOR FACILITATING RETRIEVAL OF AN INDIVIDUAL GROUP USING A LIST OF GROUPS, A LIST OF SELECTED GROUP MEMBERS AND A LIST OF MEMBERS OF THE GROUPS EXCLUDING THE SELECTED GROUP MEMBERS

BACKGROUND OF THE INVENTION

1. Field of the Invention

The present invention relates to an image processing apparatus and to an image processing method.

2. Description of the Related Art

An image processing apparatus of the type that is capable of detecting a person's face by analytical processing of a captured video is coming into wider use. Owing to improvements in the accuracy of face recognition, it has become possible to compare the results of face detection applied to multiple items of video and to determine whether detected faces are those of the same person. This has made it possible to store the results of face detection applied to video and to create a database for retrieving an image in which a designated person appears.

Further, an increase in capacity of recording media in recent years often is accompanied by the storage of many items of video within an image sensing apparatus, and selecting any item of video from among these is difficult. As an implementation to which a face recognition technique is applied in order to solve this problem, a moving picture display technique has been proposed in which video is divided into arbitrary sections and sections in which certain persons appear are retrieved and displayed in a list, thereby facilitating the selection of a desired section (see the specification of Japanese Patent Laid-Open No. 10-234004).

Further, a method of facilitating association between an image and a person captured in the image and retrieval of the image has also been proposed (see the specification of Japanese Patent Laid-Open No. 2006-079461). This is a technique whereby persons included in the same image are grouped, a plurality of images are classified based upon the group and video retrieval is performed using the group as an index.

However, with the proposal of Japanese Patent Laid-Open No. 10-234004, only video in which a single person has been captured can be retrieved, and retrieval efficiency is not high enough for use in devices such as consumer camcorders and digital cameras where there are many opportunities shoot specific persons such as family members and friends.

Further, with the technique of Japanese Patent Laid-Open No. 2006-079461, it is necessary to find and designate a desired group out of all groups detected in order to perform retrieval. In a case where there are a large number of groups, therefore, it is not easy to find one group among these. An alternative method that is conceivable is to allow the user to designate all of the persons included in a desired group, whereby the group is specified. However, searching all registered persons only for persons belonging to the group is laborious; the larger the number of groups and the larger the number of persons belonging to these groups, the more labor is imposed upon the user.

SUMMARY OF THE INVENTION

The present invention has been devised in view of these problems and provides a technique so adapted that a desired group can be selected with ease.

In order to solve the aforementioned problems, the present invention provides an image processing apparatus comprising: an image detection unit configured to detect whether an image matching a predetermined conditions exists in input video; an image analyzing unit configured to acquire a feature data that is indicative of a feature of an image from the image detected by the image detection unit; an image identifying unit configured to compare the feature data of a plurality of images detected by the image detection unit and identifying whether the images are images in which the same individual is shot; an individual information storage unit configured to store individual information of an individual identified by the image identifying unit; an individual group storage unit configured to store a combination of a plurality of individual information as an individual group; an individual information selecting unit configured to select individual information from among a plurality of individual information; an individual group retrieval unit configured to retrieve an individual group that includes the individual from the individual information selected by the individual information selecting unit; and an interface unit configured to display a list of individual groups retrieved by the individual group retrieval unit; wherein the interface unit displays a list of individual information from which individual information selected by the individual information selecting unit and individual information lapped over the individual information included in the retrieved individual groups are excluded from individual information included in individual groups retrieved by the individual group retrieval unit, and the individual group retrieval unit narrows down individual groups to be retrieved by adding on individual information designated from the individual information displayed in the list.

The present invention also provides an image processing method comprising: an image detection step of detecting whether an image matching a predetermined conditions exists in input video; an image analyzing step of acquiring a feature data that is indicative of a feature of an image from the image detected in the image detection step; an image identifying step of comparing the feature data of a plurality of images detected in the image detection step and identifying whether the images are images in which the same individual is shot; an individual information storage step of storing individual information of an individual identified in the image identifying step; an individual group storage step of storing a combination of a plurality of individual information as an individual group; an individual information selecting step of selecting individual information from among a plurality of individual information; an individual group retrieval step of retrieving an individual group that includes the individual from the individual information selected in the individual information selecting unit; and an interface step of displaying a list of individual groups retrieved in the individual group retrieval step; wherein the interface step displays a list of individual information from which individual information selected in the individual information selecting step and individual information lapped over the individual information included in the retrieved individual groups are excluded from individual information included in individual groups retrieved in the individual group retrieval step, and the individual group retrieval step narrows down individual groups to be retrieved by adding on individual information designated from the individual information displayed in the list.

According to the present invention, combinations of individuals identified from a predetermined video are stored beforehand as individual groups, and a desired group can readily be selected from among a plurality of individual groups.

Further features of the present invention will become apparent from the following description of exemplary embodiments with reference to the attached drawings.

BRIEF DESCRIPTION OF THE DRAWINGS

FIG. 3 is a diagram exemplifying the data structure of video section information stored in a video recording unit;

FIG. 4 is a diagram exemplifying the data structure of individual information stored in an individual information storage unit;

FIG. 5 is a diagram exemplifying the data structure of individual groups stored in an individual group storage unit;

FIG. 7 is a diagram exemplifying an interface for individual group retrieval processing in the image processing apparatus;

FIG. 11 is a diagram exemplifying an interface used when group is finalized;

FIG. 17 is a diagram exemplifying an interface used when a scene is retrieved.

DESCRIPTION OF THE EMBODIMENTS

Embodiments for practicing the present invention will now be described in detail with reference to the accompanying drawings. The embodiments set forth below are examples for realizing the present invention and are to be suitably modified or changed depending upon the configuration and various conditions of the apparatus to which the present invention is applied. The present invention is not limited to the embodiments that follow.

First Embodiment

Figure 1:
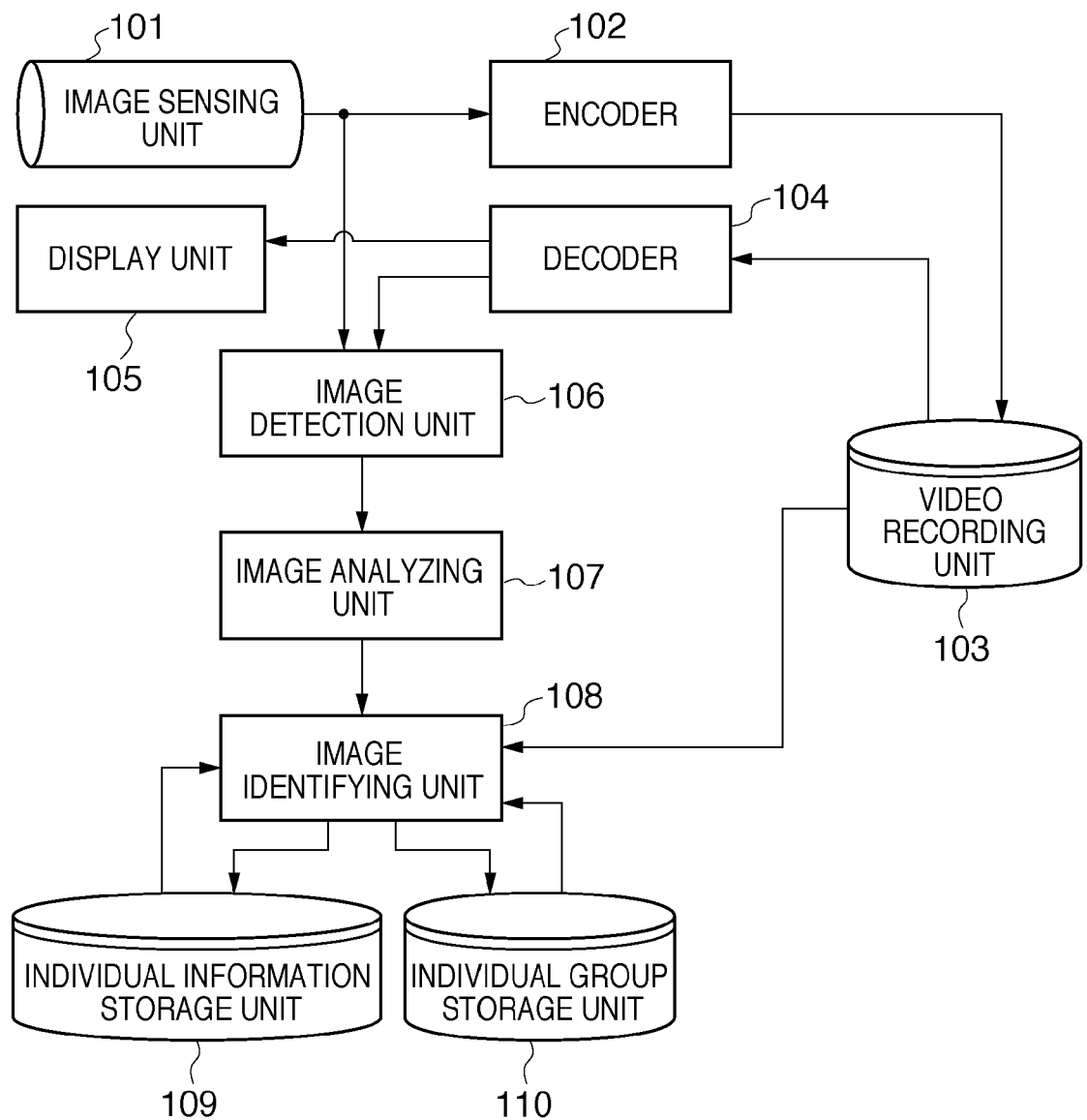
FIG. 1 is a schematic structural view of function blocks related to individual group registration processing as part of image processing executed by an image processing apparatus according to a first embodiment of the present invention.

FIG. 1 is a schematic structural view of function blocks related to individual group registration processing as part of image processing executed by an image processing apparatus according to a first embodiment of the present invention. This embodiment will be described taking a camcorder as one example of the image processing apparatus. However, it is possible for processing similar to that of this embodiment to be executed using an application of a personal computer having an image management function.

A video signal generated by photo-electric conversion of a subject image using an image sensing unit 101 is encoded into a predetermined video format in an encoder 102 and is recorded on a video recording unit 103 as video data. At the time of reproduce, video data read out of the video recording unit 103 is decoded in a decoder 104 and displayed on a display unit 105.

An image detection unit 106 detects whether video contains images that match a predetermined conditions. Video that is input to the image detection unit 106 may be either video from a shooting lens while shooting is in progress or video decoded in the decoder while reproduce is in progress. If the image detection unit 106 detects an image matching the predetermined conditions in the entered video, it transmits this image to an image analyzing unit 107.

The image analyzing unit 107 acquires a feature data indicative of a feature of the image from the image received from the image detection unit 106 and transmits the feature data to an image identifying unit 108.

The image identifying unit 108 compares the feature data received from the image analyzing unit 107 with the feature data of individuals identified in the past and already stored in an individual information storage unit 109. If the result of the comparison is a determination that an individual is identical with an individual already identified, an individual number of the applicable individual is acquired from the individual information storage unit 109, the entered video reaches the end thereof and is stored temporarily until identification of the image is completed.

If the result of the comparison is a determination that an individual is not an individual that has been identified thus far, then the feature data is stored in the individual information storage unit 109 as new individual information. Furthermore, a newly assigned individual number is acquired and the entered video is stored temporarily until the end of the video is reached and image identification is completed.

If entered video reaches the end and image identification is completed, the image identifying unit 108 compares a combination of individual numbers of individuals that have been identified in the entered video with individual group information that has been stored in an individual group storage unit 110. If a combination of individuals is identical with an individual group that has already been registered in the individual group storage unit 110, the number of the video section that has undergone identification this time is acquired from the video recording unit 103. Furthermore, the new video section number is added to a video section number list corresponding to the applicable individual group that has been stored in the individual group storage unit 110.

If the result of the comparison is that the combination of individuals does not match an individual group that has been stored in the individual group storage unit 110, then the combination of individuals that has undergone identification this time is stored in the individual group storage unit 110 as a new individual group. The number of the video section that has undergone identification this time is now acquired from the video recording unit 103 and is stored in correspondence with the new individual group.

Figure 2:
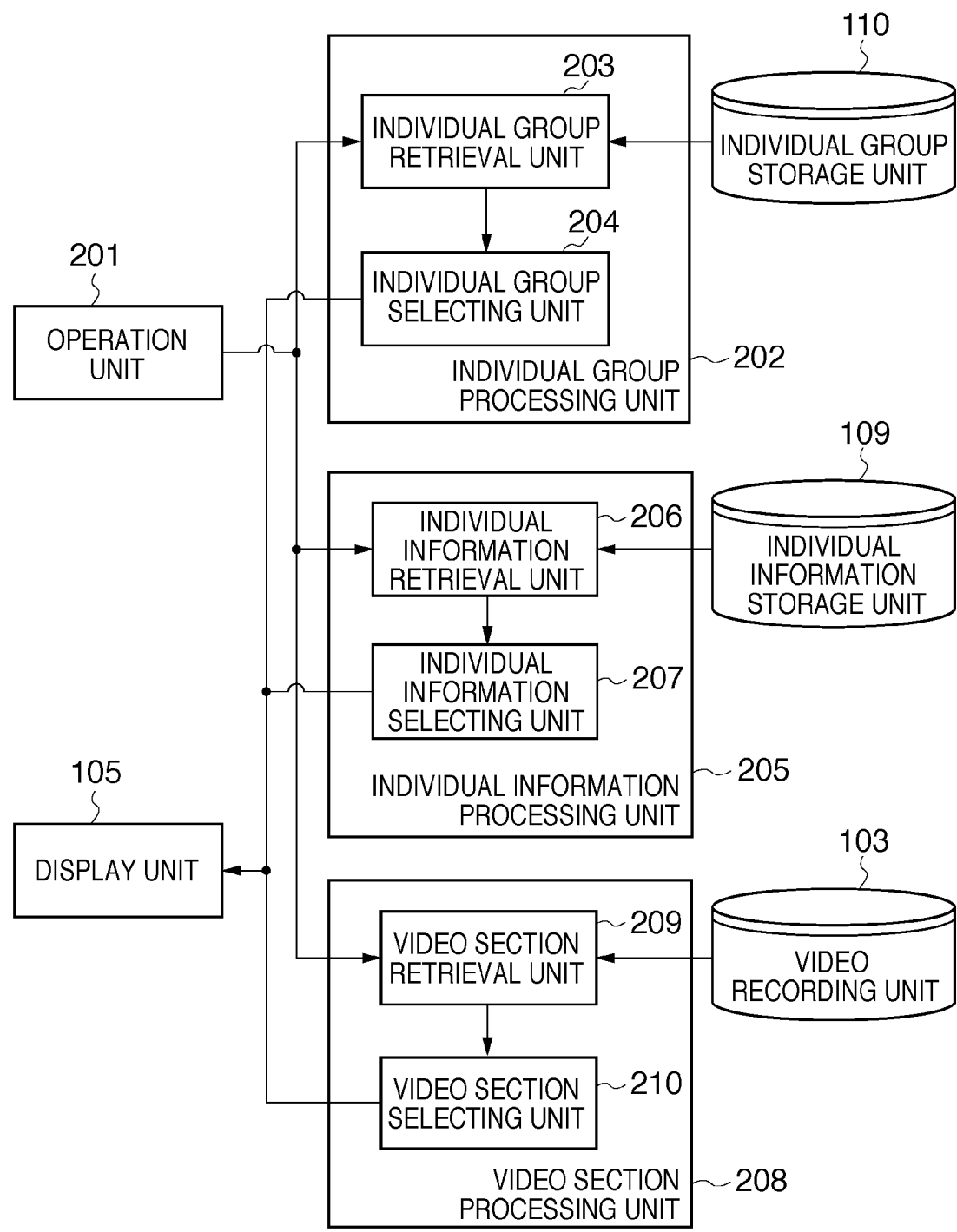
FIG. 2 is a schematic structural view of function blocks related to individual group retrieval processing as part of image processing executed by an image processing apparatus according to the first embodiment.

FIG. 2 is a schematic structural view of function blocks related to individual group retrieval processing as part of image processing executed by the image processing apparatus according to the first embodiment.

The user issues commands via an operation unit 201. Connected to the operation unit 201 are an individual group processing unit 202, an individual information processing unit 205 and a video section processing unit 208.

The individual group processing unit 202 comprises an individual group retrieval unit 203 and an individual group selecting unit 204. On the basis of one or a plurality of individual information numbers that have been input to the individual group retrieval unit 203 via the operation unit 201, the individual group processing unit 202 retrieves the individual groups containing the individuals corresponding to the individual information numbers from the individual group storage unit 110. Furthermore, the individual group processing unit 202 transmits the results to the individual group selecting unit 204. The individual group selecting unit 204 displays the results of retrieval on the display unit 105.

The user selects as necessary a predetermined individual group from among the individual groups displayed on the display unit 105. The selection made by the user is transmitted from the operation unit 201 to the individual group selecting unit 204 via the individual group retrieval unit 203.

The individual information processing unit 205 comprises an individual information retrieval unit 206 and an individual information selecting unit 207. On the basis of one or a plurality of individual information numbers that have been input to the individual information retrieval unit 206 via the operation unit 201, the individual information processing unit 205 retrieves individual information corresponding to the individual information numbers from the individual information storage unit 109 and transmits the results to the individual information selecting unit 207. The individual information selecting unit 207 displays the results on the display unit 105. The user selects as necessary predetermined individual information from the individual information displayed on the display unit 105. The selection made by the user is transmitted from the operation unit 201 to the individual information selecting unit 207 via the individual information retrieval unit 206.

The video section processing unit 208 comprises a video section retrieval unit 209 and a video section selecting unit 210. On the basis of one or a plurality of video section numbers that have been input to the video section retrieval unit 209 via the operation unit 201, the video section processing unit 208 retrieves video sections corresponding to the video section numbers from the video recording unit 103 and transmits the results of video retrieval to the video section selecting unit 210. The video section selecting unit 210 displays the results of video retrieval on the display unit 105. The user selects as necessary a predetermined video section from the video sections displayed on the display unit 105. The selection made by the user is transmitted from the operation unit 201 to the video section selecting unit 210 via the video section retrieval unit 209.

FIG. 3 is an example of the data structure of video section information stored in the video recording unit 103. The video recording unit 103 stores the shooting date and time on which a video section was shot and the video data itself in correspondence with the video section number that distinguishes the video section.

FIG. 4 is an example of the data structure of individual information stored in the individual information storage unit 109. The individual information storage unit 109 stores a representative image that well represents an individual and the feature data itself acquired from the information of this individual in correspondence with the individual number that distinguishes this individual.

FIG. 5 is an example of the data structure of individual groups stored in the individual group storage unit 110. The individual group storage unit 110 stores a list of individual numbers of individuals contained in each individual group and the video section numbers in which these individual groups where shot in correspondence with the individual group number that distinguishes the individual group.

Figure 6A:
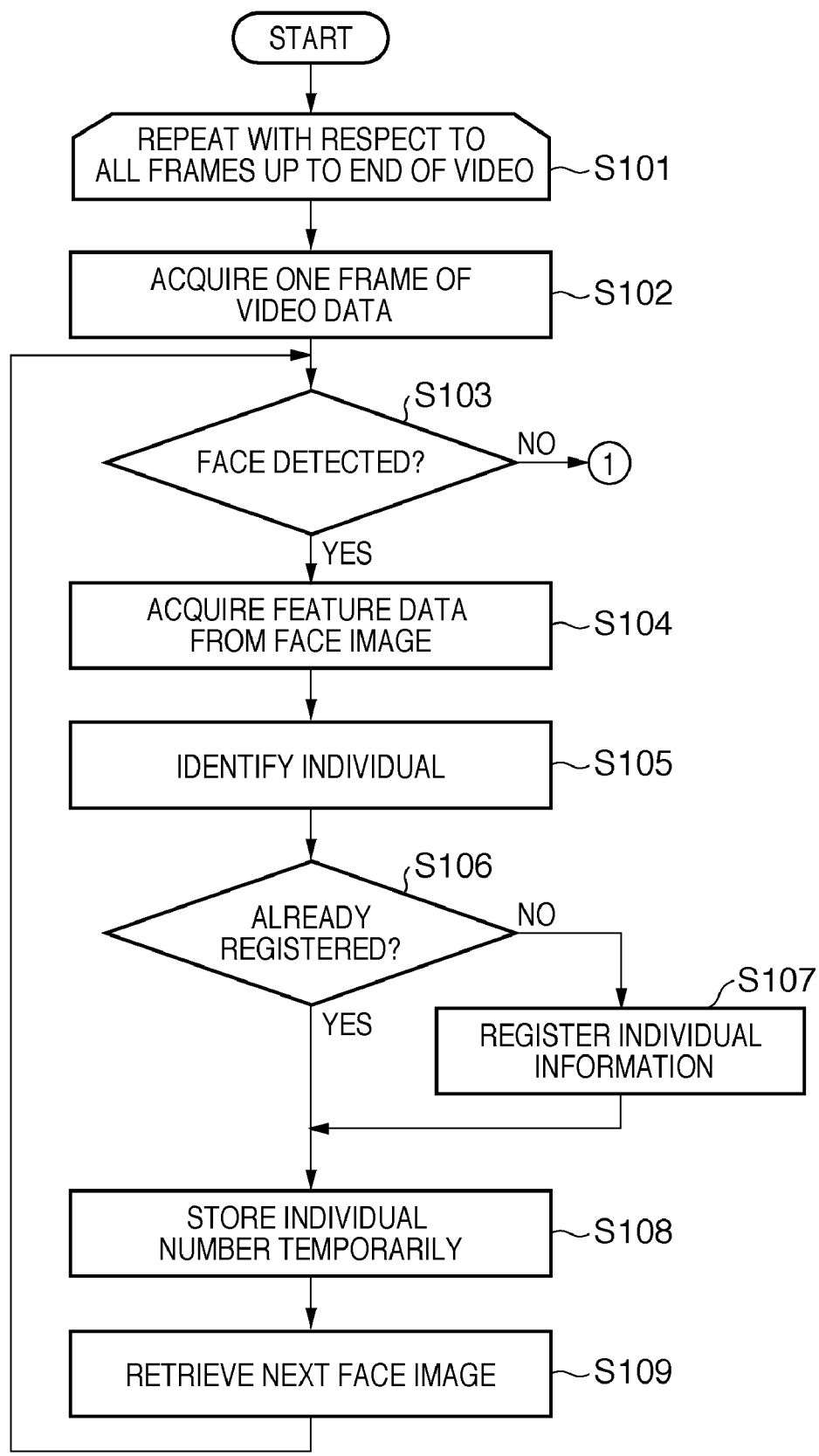
FIGS. 6A and 6B are flowcharts illustrating individual group registration processing as part of image processing executed by the image processing apparatus of the first embodiment.
Figure 6B:
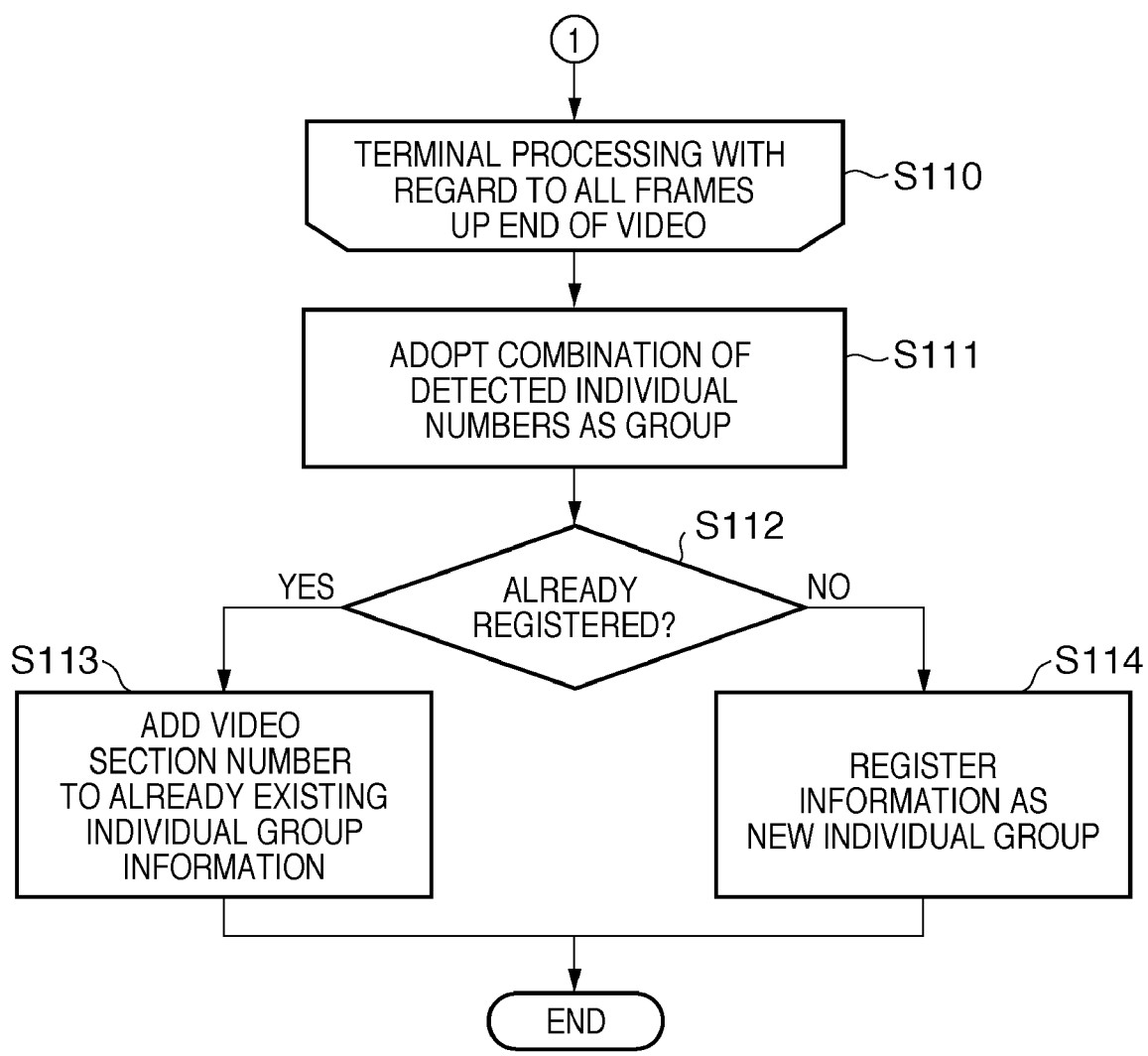

FIGS. 6A and 6B are flowcharts illustrating individual group registration processing as part of image processing executed by the image processing apparatus of the first embodiment. In the description that follows, an example in which a person's face is used as the target of face detection is illustrated. Accordingly, here an "individual" refers to a single person and an "individual group" refers to a group of persons. It should be noted that processing can be executed in the same manner even if something other than a face has been used as the target of image detection.

Processing for registering a person group includes first applying person identification processing to all frames of an entered video signal. To this end, a series of processing operations involves repeating processing frame by frame (S101).

Next, the image detection unit 106 acquires one frame of video data (S102).

Next, the image detection unit 106 determines whether the face of a person exists in the video that that it has acquired (S103).

If a face image is detected, the face image is transmitted to the image analyzing unit 107, which proceeds to acquire, from this face image, feature data for identifying the individual (S104).

The acquired feature data is transmitted to the image identifying unit 108. The image identifying unit 108 compares this feature data with the face-image feature data of already known persons who have been stored in the individual information storage unit 109 and determines whether this feature data is the same as that of an already known person (S105).

In a case where the person concerned has not been registered in the individual information storage unit 109, this person is added to the individual information storage unit 109 as a new person and data such as the feature data of this person is registered (S106→S107).

In a case where the relevant person has been registered in the individual information storage unit 109, control proceeds to the next processing step (S106→S108).

The image identifying unit 108 acquires the individual number of the detected person from the individual information storage unit 109 and stores this individual number temporarily (S108).

The identification of one face image is completed by steps S104 to S108 and retrieval of the next face image in the frame is performed (S109).

When face-image identification processing is executed with regard to all frames of the entered video, this completes identification processing (S110).

A combination of individual numbers corresponding to all persons detected in identification processing is adopted as a group (S111).

It is determined whether the group generated in step S111 has been stored in the individual group storage unit (S112).

If the group has already been registered, the video section number of the video that has undergone identification this time is added to the video section number list corresponding to this group (S112→S113).

If the group has not been registered in the individual group storage unit, it is registered in the individual group storage unit as a new group and information such as individual numbers and video section number is stored (S112→S114).

This completes processing for registering an individual group.

FIG. 7 is an example of a user interface associated with individual group retrieval processing as part of image processing executed by the image processing apparatus of the first embodiment.

The user interface comprises a block 301 of a list of persons already selected, a block 302 of a list of group member candidates, and a block 303 of a list of group candidates.

Persons who have been selected by the user are displayed in the block 301 in the course of individual group retrieval. The order of persons displayed in the list may be not just the order in which the persons were selected but may also be decided based upon a ranking such as the alphabetical order of the person names, the numerical order of registration numbers or the order of the degree of importance of the persons.

Displayed in the block 302 of the list of group member candidates is a list of persons from which are excluded persons who have been selected by the user from among members of groups containing all persons selected by the user in the course of individual group retrieval. The order of persons displayed in the list may not be just the numerical order of the registration numbers but may also be decided based upon a ranking such as the order of the degree of pertinence to already selected persons or the order of the degree of importance of the persons.

Displayed in the block 303 of a list of group candidates is a list of groups containing all persons selected by the user in the course of individual group retrieval. The order of the groups displayed in the list may not be just the numerical order of the registration numbers but may also be decided based upon a ranking such as the order of the numbers of members in the groups or the order of the degree of pertinence to already selected persons.

Figure 8:
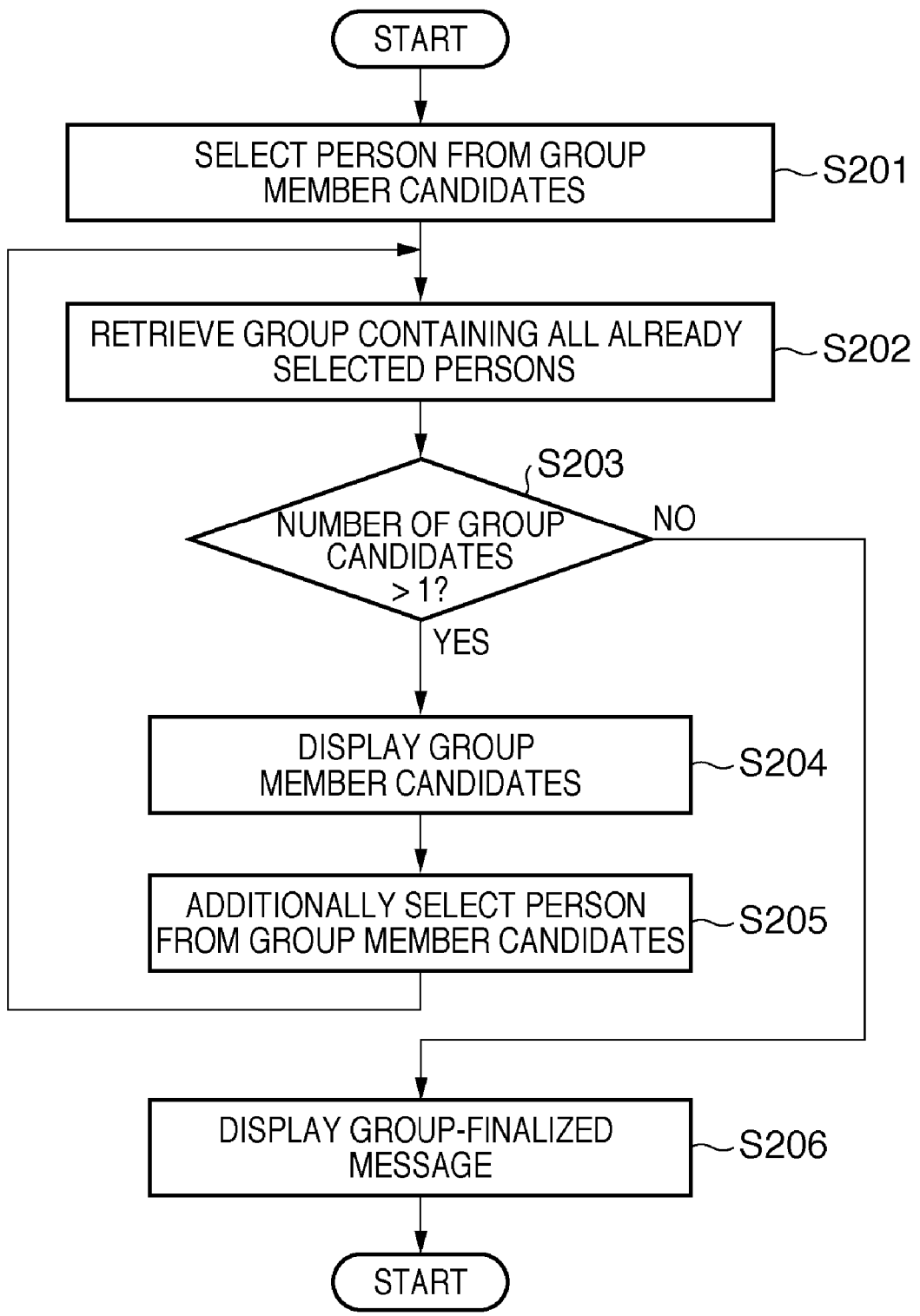
FIG. 8 is a flowchart illustrating individual group retrieval processing as part of image processing executed by the image processing apparatus of the first embodiment.

FIG. 8 is a flowchart illustrating individual group retrieval processing as part of image processing executed by the image processing apparatus of the first embodiment.

Figure 9:
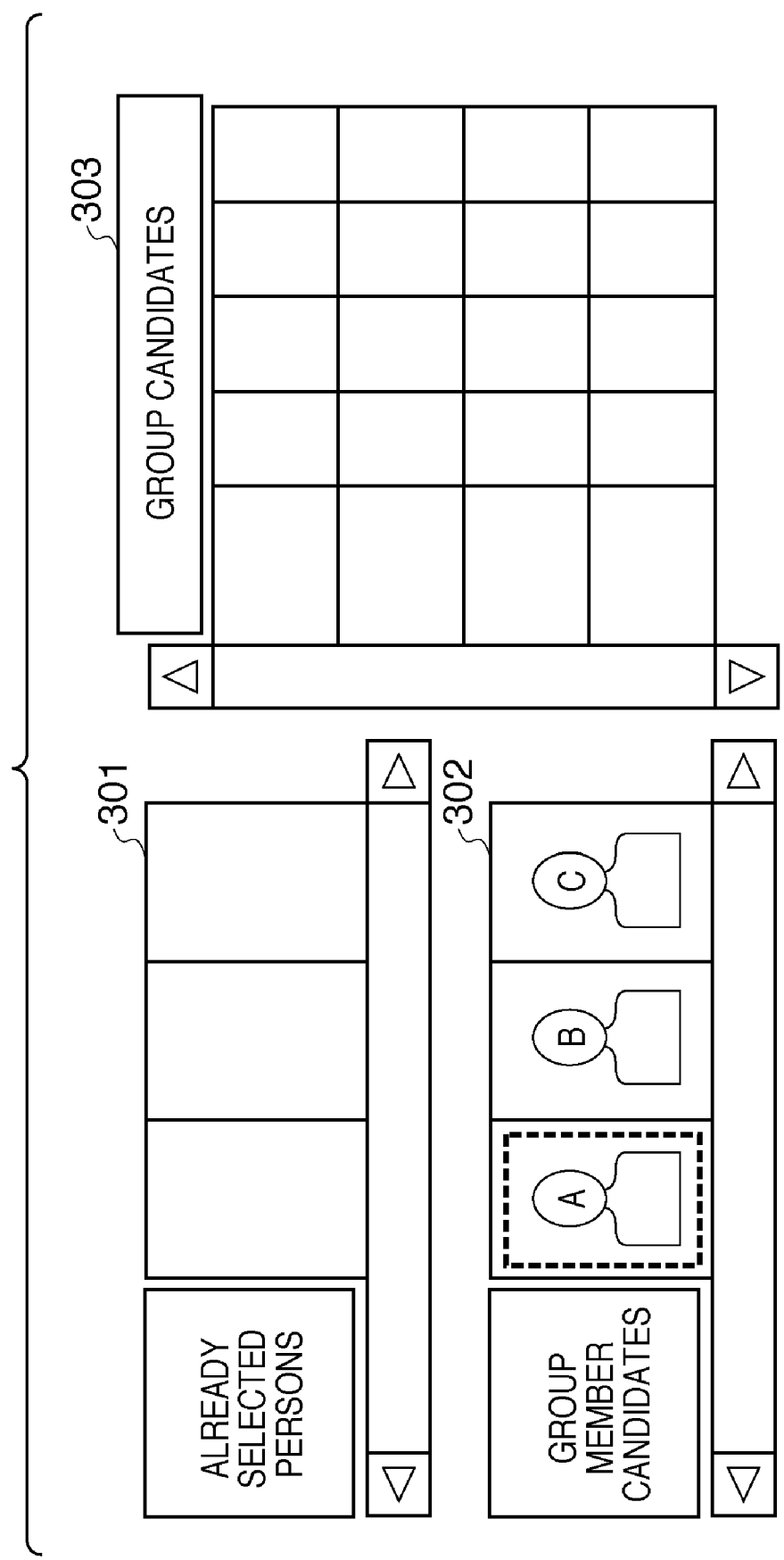
FIG. 9 is a diagram exemplifying an interface used when a person is selected.

In order to retrieve a group of individuals, first the user selects one person included in the group desired to be retrieved. In a state in which not even one person has been selected, all persons who have been registered in the individual information storage unit 109 are displayed as a list in the block 302 of the list of group member candidates and the user selects any one of the persons from among these persons (S201). FIG. 9 exemplifies the user interface employed in step S201.

Information concerning the selected person is transmitted to the individual group processing unit 202. From the individual group storage unit 110 the individual group processing unit 202 retrieves the group or groups containing all persons of which information has been received and displays this group or groups in the block 303 of the list of group candidates (S202).

If the number of relevant group candidates is greater than one, the individual information processing unit 205 retrieves the persons included in a candidate group from the individual information storage unit 109 and displays the results in the block 302 of the list of group member candidates (S203→S204).

Figure 10:
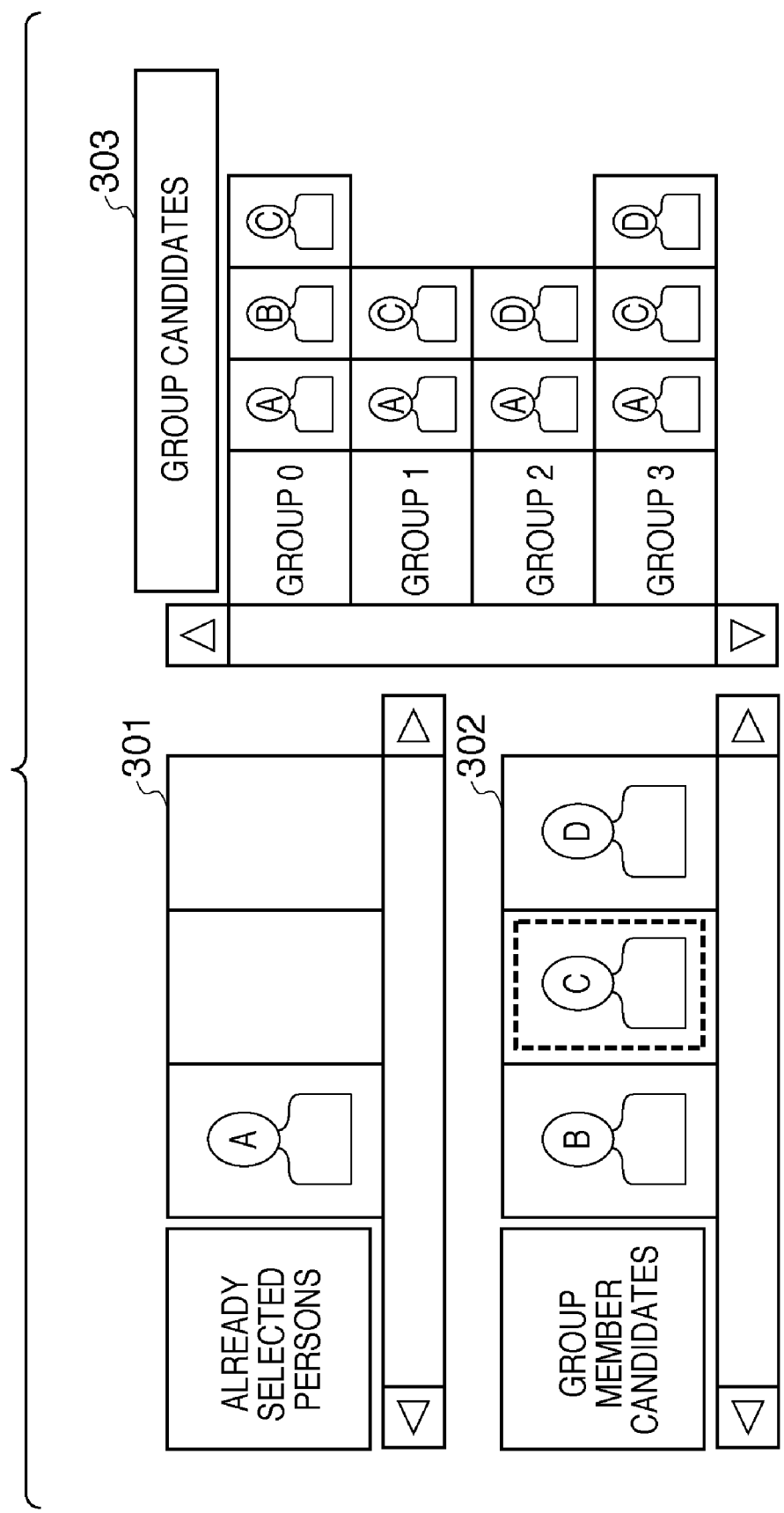
FIG. 10 is a diagram exemplifying an interface used when a person is additionally selected.

The user additionally selects one person included in the retrieved group from among the persons displayed in the block 302 of the list of group member candidates (S205). FIG. 10 exemplifies the user interface for S205. Specifically, FIG. 10 exemplifies the user interface in a state in which person A has already been selected in step S201. All groups that include person A are displayed in the block 303 of the list of group candidates. All persons, with the exception of the already selected person A, who belong to any group displayed in the block 303 of the list of group candidates will be displayed in the list 302 of group member candidates. If the user additionally selects person C in step S205, groups that will be displayed in the block 303 of the list of group candidates will be limited solely to groups to which persons A and C belong. In accordance with such a selection, all persons, with the exception of persons A and C, who belong to any group to which both persons A and C belong, will be displayed in the list 302 of group member candidates. By thus increasing the number of already selected persons, groups displayed in the block 303 of the list of group candidates and persons displayed in the block 302 of the list of group member candidates are gradually narrowed down.

The processing of steps S202 to S205 is repeated until the applicable group candidates become a single candidate. When a single group candidate is attained, a message indicating that the group desired to be retrieved has been finalized is displayed and retrieval processing is terminated (S203→S206). FIG. 11 exemplifies the interface associated with S206.

According to this embodiment, a user can retrieve a desired group by selecting persons one after another. At such time only persons included in the same group as that of the selected person are displayed as group member candidates. As a result, it is no longer necessary to select persons who are irrelevant, the operation performed by the user is simplified and the number of times selections are made can be reduced.

Second Embodiment

Figure 12A:
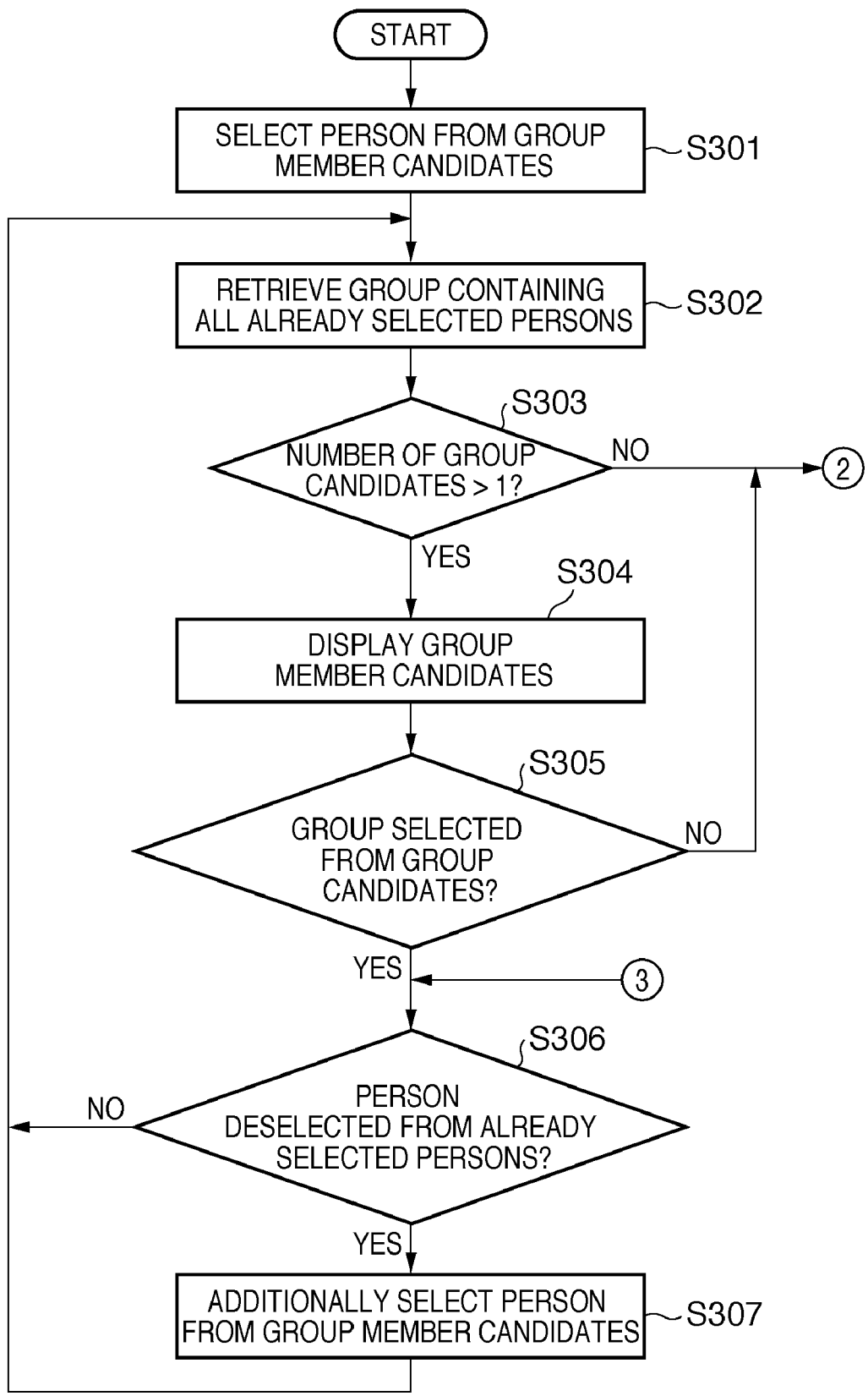
FIGS. 12A and 12B are flowcharts illustrating individual group retrieval processing as part of image processing executed by an image processing apparatus according to a second embodiment of the present invention.
Figure 12B:
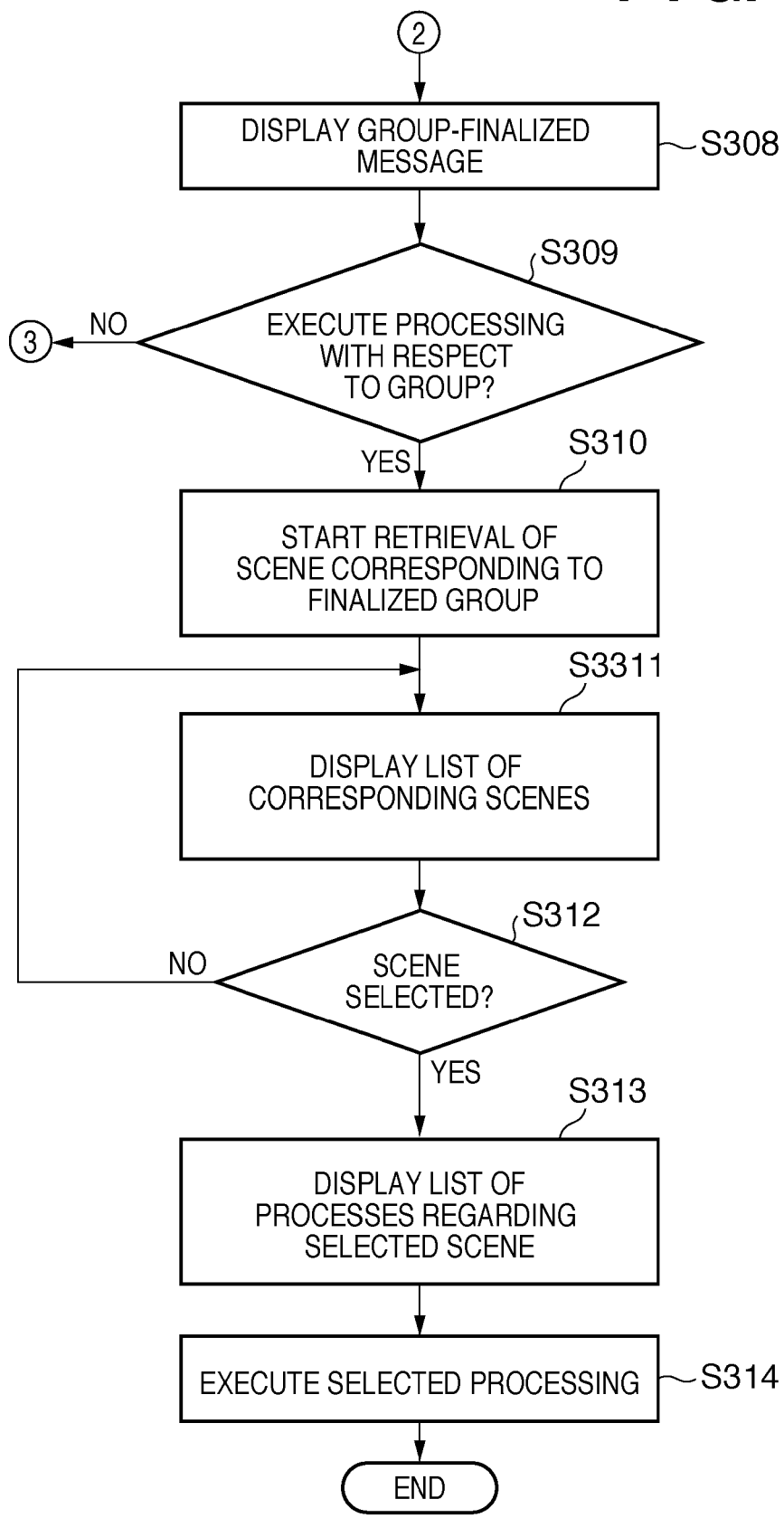

FIGS. 12A and 12B are flowcharts illustrating individual group registration processing as part of image processing executed by an image processing apparatus according to a second embodiment of the present invention. This embodiment is characterized in that unnecessary persons are deselected from among already selected persons in the course of group retrieval according to the first embodiment. Further, this embodiment is characterized in that group selection is made possible in a state in which groups have not been narrowed down to a single group, and an interface is provided for issuing a processing command upon retrieving a video section that corresponds to a finalized group.

Since the processing of steps S301 to S304 in FIG. 12A is processing similar to that of steps S201 to S204 in FIG. 8, this processing need not be described again.

Figure 13:
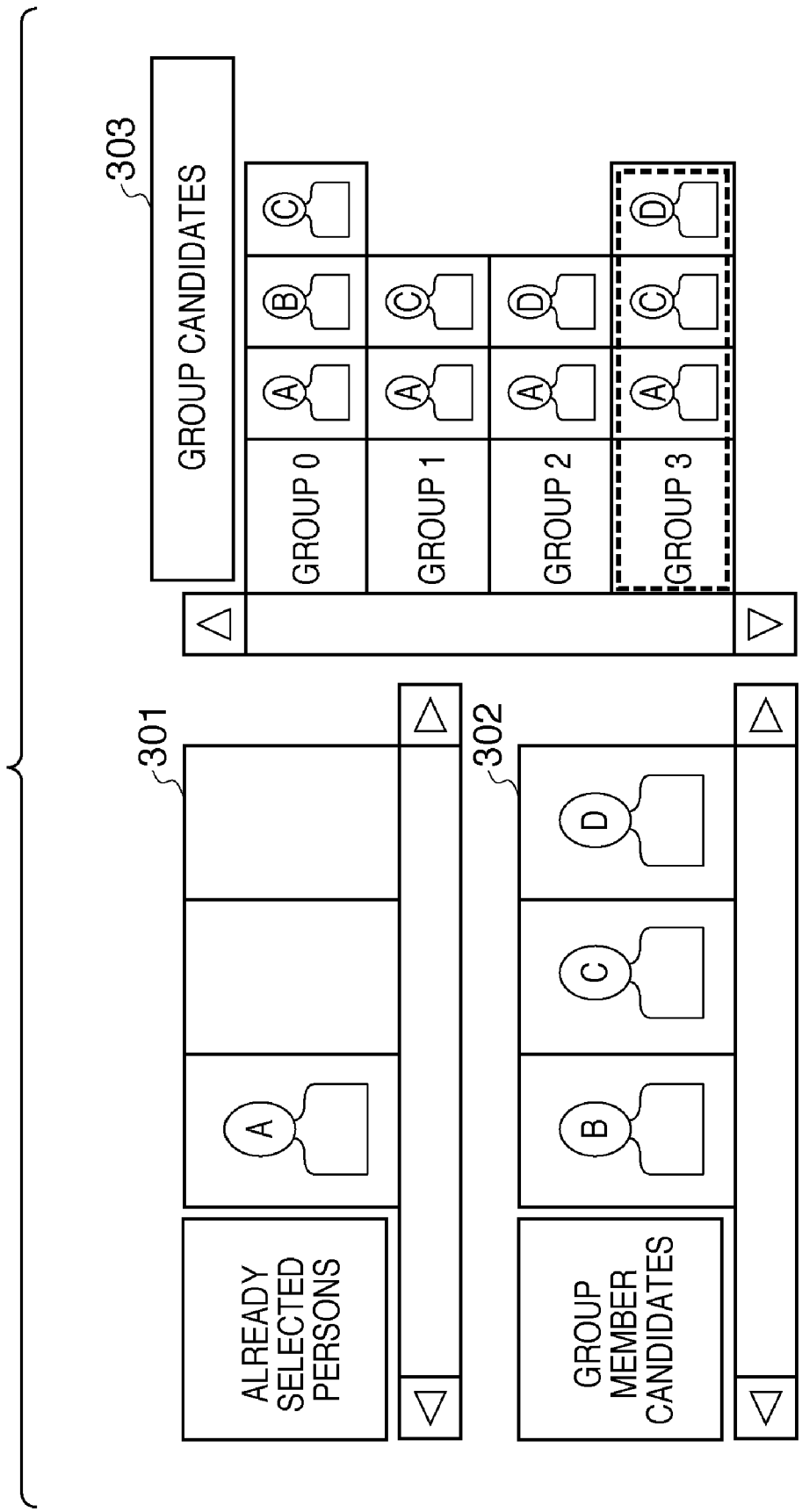
FIG. 13 is a diagram exemplifying an interface used when a group is selected.

In a case where the number of group candidates of interest is greater than one, any group can be selected directly from the listed group candidates. If a large number of groups are being displayed in the block 303 of the list of group candidates, selecting any group directly is troublesome. However, if persons already selected are increased in number so that the number of groups displayed in the list block diminishes, the user can select a desired group with facility. FIG. 13 exemplifies an interface associated with S308. In a case where a group has been selected directly, a message indicating that the group has been finalized is displayed (S305→S308).

Figure 14:
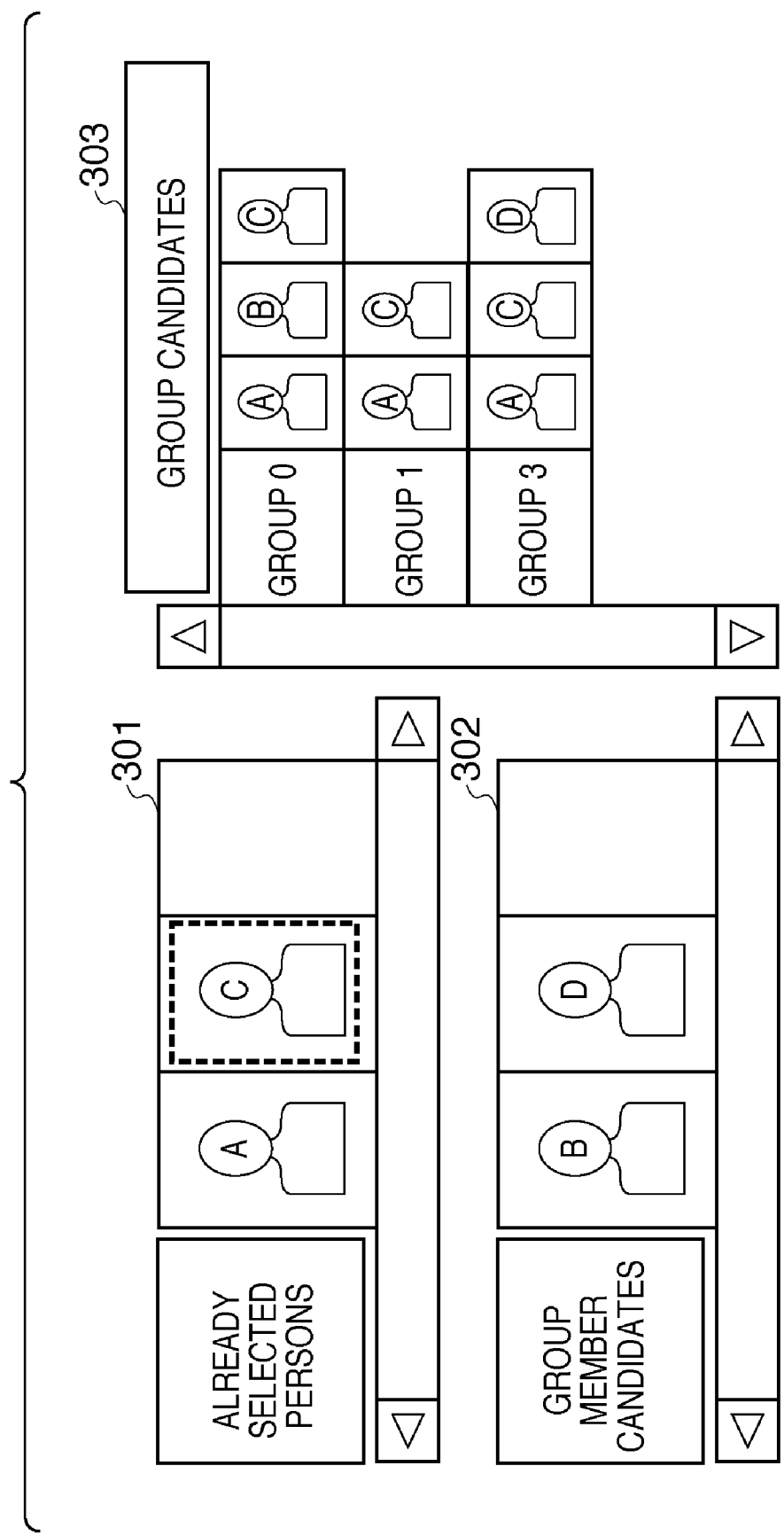
FIG. 14 is a diagram exemplifying an interface used when a person is selected.

Further, in a case where it has been determined that the groups listed in the block 303 of the list of group candidates do not include a group the retrieval of which is being attempted, retrieval of group candidates can be performed again by deselecting those persons believed to be unnecessary from the block 301 of the list of already selected persons (S305→S306). FIG. 14 exemplifies the interface associated with S306.

If an unnecessary person has been deselected, groups that include the remaining persons already selected are retrieved again (S306→S302).

If a person has not been deselected, a person is additionally selected from the group member candidates and the groups are narrowed down (S307→S302).

Figure 15:
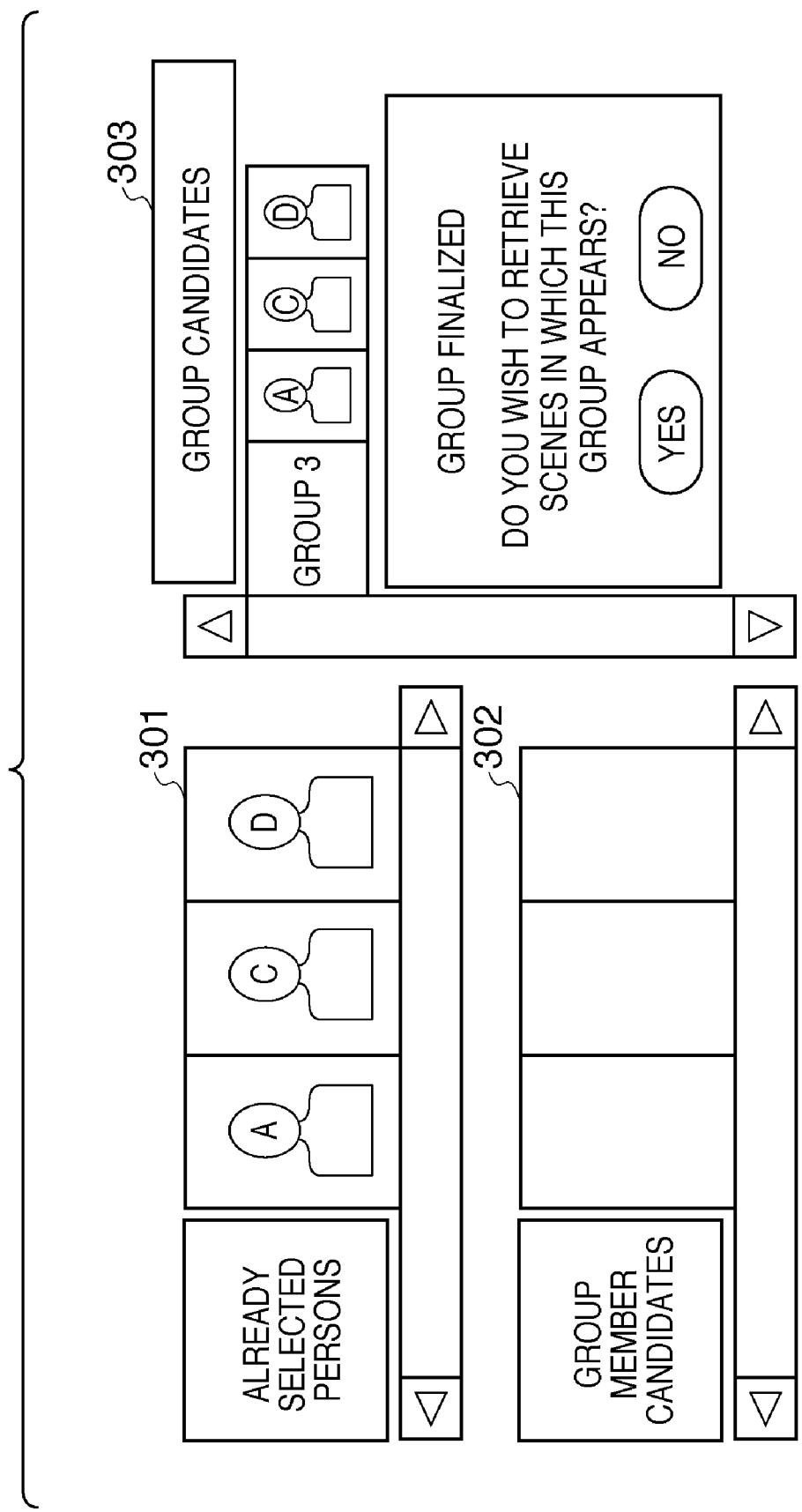
FIG. 15 is a diagram exemplifying an interface used when group is finalized.

In a case where the number of group candidates becomes one and a group is finalized, or in a case where a group has been selected by a command from the user, a message verifying group finalization is displayed (S308). FIG. 15 exemplifies the interface at execution of S308. In this example, retrieval of the corresponding scene is illustrated as processing executed next with regard to the finalized group. However, the processing here may not be just scene retrieval but may also be processing executed in association with the group, such as display of a list of group members or retrieval of the date and time on which a group was shot.

In a case where execution of scene retrieval regarding a finalized group has been selected, retrieval of the scene is started (S309→S310).

In a case where execution of scene retrieval regarding a finalized group has been rejected, control returns to the processing flow of group retrieval and deselection of an already selected person is carried out as necessary, thereby enabling group retrieval to be performed again (S309→S306).

Figure 16:
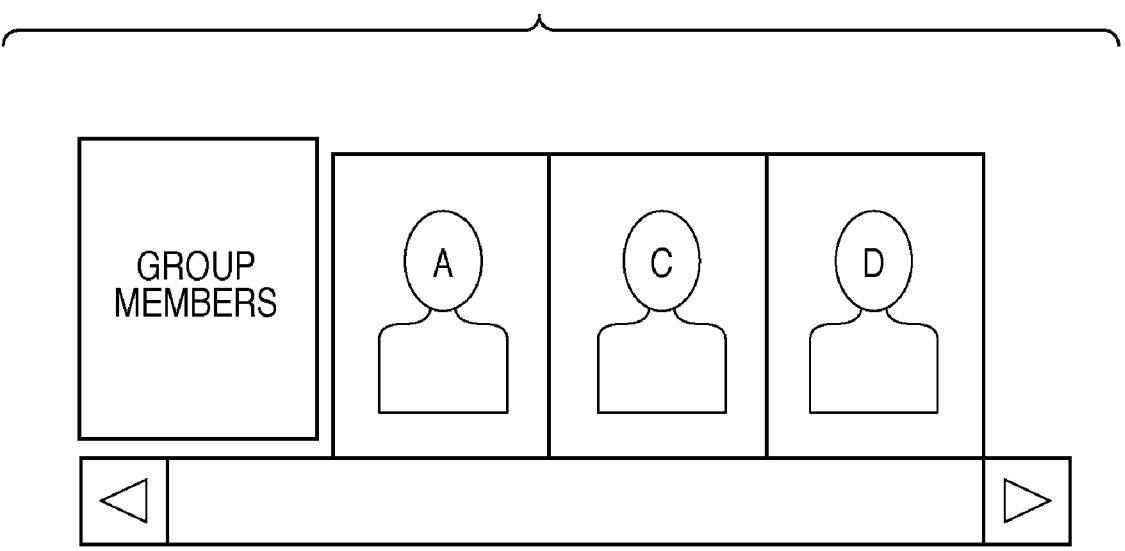
FIG. 16 is a diagram exemplifying an interface used when a scene is retrieved.

When retrieval of a scene regarding a finalized group is completed, the result is displayed in list form (S311). FIG. 16 exemplifies the interface as it appears in step S311.

The user can select any scene from among the scenes displayed in the list (S312).

If a scene has been selected, a list of processes that can be applied to the scene is displayed (S313). FIG. 17 exemplifies the interface as it appears in step S312.

If a process is selected, then this processing is executed with regard to the selected scene (S314).

According to the above-described embodiment, the user can retrieve a desired scene by successively selecting persons that appear in the scene. Furthermore, since execution of processing can be specified from within a scene that has been retrieved, the operation of searching for and reproducing a scene desired to be viewed is facilitated.

At the time of retrieval, only persons included in a group that same as that of a selected person are displayed as group member candidates. As a result, it is no longer necessary to select persons who are irrelevant, the operation performed by the user is simplified and the number of times selections are made can be reduced. These advantages are that same as those of the first embodiment.

Furthermore, any group can be selected from a list of group candidates even in a state in which a group has not been finalized. This makes it possible to finalize a group with even a smaller number of selection cycles.

Further, since unnecessary persons can be deselected from already selected persons, it is easy to redo operation in a case where a person has been selected erroneously.

According to each of the foregoing embodiments, images that match a predetermined conditions are detected from a predetermined video section that has been input and the images are analyzed to thereby enable the identification of all individuals that appear in the video. A combination of individuals identified in a predetermined video section are stored beforehand as an individual group, and the individual group and video section are registered in correspondence with each other, thereby enabling the construction of a database for retrieving video sections using individual groups as an index.

By designating one or a plurality of items of individual information, individual groups in which the individuals are included can be retrieved and a predetermined individual group can be selected from among the individual groups retrieved. As a result, even in a case where the number of individual groups that have been registered in a device is a large number, a desired individual group can be retrieved and selected using, as an index, individual information the inclusion of which in an individual group is clear.

Further, when there are a plurality of individual groups containing one or a plurality of items of individual information selected in advance, all of the individual information contained in these individual groups is acquired. Then, from this individual information, a list of individual information from which previously selected individual information and individual information lapped over the individual information included in the retrieved individual groups has been excluded is generated and any individual can be additionally selected from this list. As a result, an individual belonging to the same group as that of the previously selected individual can be additionally designated and the narrowing down of individual groups can be performed efficiently.

Further, unnecessary individual information can be deselected from one or more items of previously selected individual information. As a result, in an instance where unnecessary individual information has been selected erroneously, a state in which the desired individual information has been selected can be attained without redoing the selection from the very beginning.

Further, by designating one or a plurality of individual groups, the video sections correlated with the individual groups are retrieved and a predetermined video signal can be selected from among the video sections retrieved. As a result, retrieval of a video section can be performed efficiently using individual groups as an index.

Further, whether or not a persons face exists is adopted as the target of image detection. As a result, whether a person has been shot in a predetermined video section can be detected.

Further, face information for identifying a person individually from face images of detected persons is acquired as a feature data. As a result, it is possible to acquire information for identifying whether a detected face image is that of a person identical with a person whose previously detected feature data has been stored.

Further, a single person is handled as a single individual and whether a plurality of detected person images are those of the same person is identified. As a result, how many persons have been shot in a predetermined video section can be determined.

Further, video shot continuously from the start of one recording operation to the end of this recording operation is adopted as a video section. As a result, scene retrieval can be performed based upon individual groups.

Further, a section obtained by partitioning video at a predetermined time intervals is adopted as a video section. As a result, scene retrieval on a per-time-unit basis can be performed based upon individual groups.

Further, a section obtained by partitioning video into a predetermined date-and-time sections is adopted as a video section. As a result, a scene that was shot in a date-and-time section in which an individual group was shot can be retrieved based upon this individual group. Further, a video section need not necessarily contain a moving picture or a plurality of still images, and it does not matter even if a video section contains only video comprising a single still image.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-256642, filed Oct. 1, 2008, which is hereby incorporated by reference herein in its entirety.

What is claimed is:

1. An image processing apparatus comprising:
    an image detection unit configured to detect whether an image matching a predetermined conditions exists in input video;
    an image analyzing unit configured to acquire a feature data that is indicative of a feature of an image from the image detected by said image detection unit;
    an image identifying unit configured to compare the feature data of a plurality of images detected by said image detection unit and identifying whether the images are images in which the same individual is shot;
    a storage unit configured to store individual information of an individual identified by said image identifying unit and
    a combination of a plurality of individual information as an individual group;
    an individual information selecting unit configured to select individual information from among a plurality of individual information;
    an individual group retrieval unit configured to retrieve one or a plurality of individual groups that include the individual information selected by said individual information selecting unit; and
    an interface unit configured to display a first list comprised of the one of the plurality of individual groups retrieved by said individual group retrieval unit,
    a second list including individual information selected by said individual information selecting unit, and a third list comprised of individual information which is included in individual groups including all individual information included in the second list and is not included in the second list,
    wherein the individual information selecting unit selects any one of the individual information from among the individual information included in the third list in response to a user designation, and the interface unit updates the second list by adding the individual information selected from the third list by the individual information selecting unit and updates the third list so as to correspond to the updated second list.

2. The apparatus according to claim 1, wherein the individual information selecting unit selects any one of the individual information from among the individual information included in the second list in response to a user designation, and the interface unit updates the second list by deleting the individual information selected by the individual information selecting unit from the second list and updates the third list so as to correspond to the updated second list.

3. The apparatus according to claim 1, wherein said storage unit stores a combination of all individual information identified in a video section comprising a plurality of video, as the individual group in association with the video section.

4. The apparatus according to claim 1, further comprising a video retrieval unit configured to retrieve, from one or a plurality of individual groups, video associated with the one or the plurality of individual groups.

5. The apparatus according to claim 1, wherein said image detection unit detects whether a person's face is present as an image that matches the predetermined conditions; and
    said image analyzing unit acquires feature data for identifying the face individually from the person's face detected by said image detection unit.

6. The apparatus according to claim 5, wherein said image identifying unit handles every person as a single individual and identifies whether a plurality of faces detected by said image detection unit are those of the same person.

7. The apparatus according to claim 3, wherein the video section is video continuously shot from the start of one recording operation to the end of the recording operation.

8. The apparatus according to claim 3, wherein the video section is video that is the result of partitioning video stored in the image processing apparatus, at a predetermined time intervals.

9. The apparatus according to claim 3, wherein the video section is video that is the result of partitioning video stored in the image processing apparatus, into a predetermined date-and-time sections.

10. An image processing method comprising:
    an image detection step of detecting whether an image matching a predetermined conditions exists in input video;
    an image analyzing step of acquiring a feature data that is indicative of a feature of an image from the image detected in said image detection step;
    an image identifying step of comparing the feature data of a plurality of images detected in said image detection step and identifying whether the images are images in which the same individual is shot;
    a storage step of storing individual information of an individual identified in said image identifying step and
    a combination of a plurality of individual information as an individual group;
    an individual information selecting step of selecting individual information from among a plurality of individual information;
    an individual group retrieval step of retrieving one or a plurality of individual groups that include individual information selected in said individual information selecting unit; and
    an interface step of displaying a first list comprised of the one of the plurality of individual groups retrieved in said individual group retrieval step,
    a second list including individual information selected in said individual information selecting step, and a third list comprised of individual information which is included in individual groups including all individual information included in the second list and is not included in the second list, wherein in said individual information selecting step, any one of the individual information is selected from among the individual information included in the third list in response to a user designation, and in the interface step, the second list is updated by adding the individual information selected from the third list by the individual information selecting step and the third list is updated so as to correspond to the updated second list.

11. The method according to claim 10, wherein in the individual information selecting step, any one of the individual information is selected from among the individual information included in the second list in response to a user designation, and in the interface step, the second list is updated by deleting the individual information selected by the individual information selecting step from the second list and the third list is updated so as to correspond to the updated second list.

12. The method according to claim 10, wherein said storage step stores a combination of all individual information identified in a video section comprising a plurality of video, as the individual group in association with the video section.

13. The method according to claim 10, further comprising a video retrieval step of retrieving, from one or a plurality of individual groups, video associated with the one or plurality of individual groups.

14. The method according to claim 10, wherein said image detection step detects whether a person's face is present as an image that matches the predetermined conditions; and said image analyzing step acquires feature data for identifying the face individually from the person's face detected in said image detection step.

15. The method according to claim 14, wherein said image identifying step handles every person as a single individual and identifies whether a plurality of faces detected in said image detection step are those of the same person.

16. The method according to claim 12, wherein the video section is video continuously shot from the start of one recording operation to the end of the recording operation.

17. The method according to claim 12, wherein the video section is video that is the result of partitioning video stored in an image processing apparatus, at a predetermined time intervals.

18. The method according to claim 12, wherein the video section is video that is the result of partitioning video stored in an image processing apparatus, into a predetermined date-and-time sections.

19. A non-transitory storage medium storing a program for causing a computer to execute an image processing method comprising:

an image detection step of detecting whether an image matching a predetermined conditions exists in input video;

an image analyzing step of acquiring a feature data that is indicative of a feature of an image from the image detected in said image detection step;

an image identifying step of comparing the feature data of a plurality of images detected in said image detection step and identifying whether the images are images in which the same individual is shot;

a storage step of storing individual information of an individual identified in said image identifying step and a combination of a plurality of individual information as an individual group;

an individual information selecting step of selecting individual information from among a plurality of individual information;

an individual group retrieval step of retrieving one or a plurality of individual groups that includes the individual information selected in said individual information selecting step; and an interface step of displaying a first list comprised of the one of the plurality of individual groups retrieved in said individual group retrieval step, a second list including individual information selected in said individual information selecting step, and a third list comprised of individual information which is included in individual groups including all individual information included in the second list and is not included in the second list, wherein in said individual information selecting step, any one of the individual information is selected from among the individual information included in the third list in response to a user designation, and in said interface step, the second list is updated by adding the individual information selected from the third list in said individual information selecting step and the third list is updated so as to correspond to the updated second list.

\* \* \* \* \*